R. C. WRENN.
Preparing Cotton-Seed for Planting.
No. 13,894.
Patented Dec. 4, 1855.
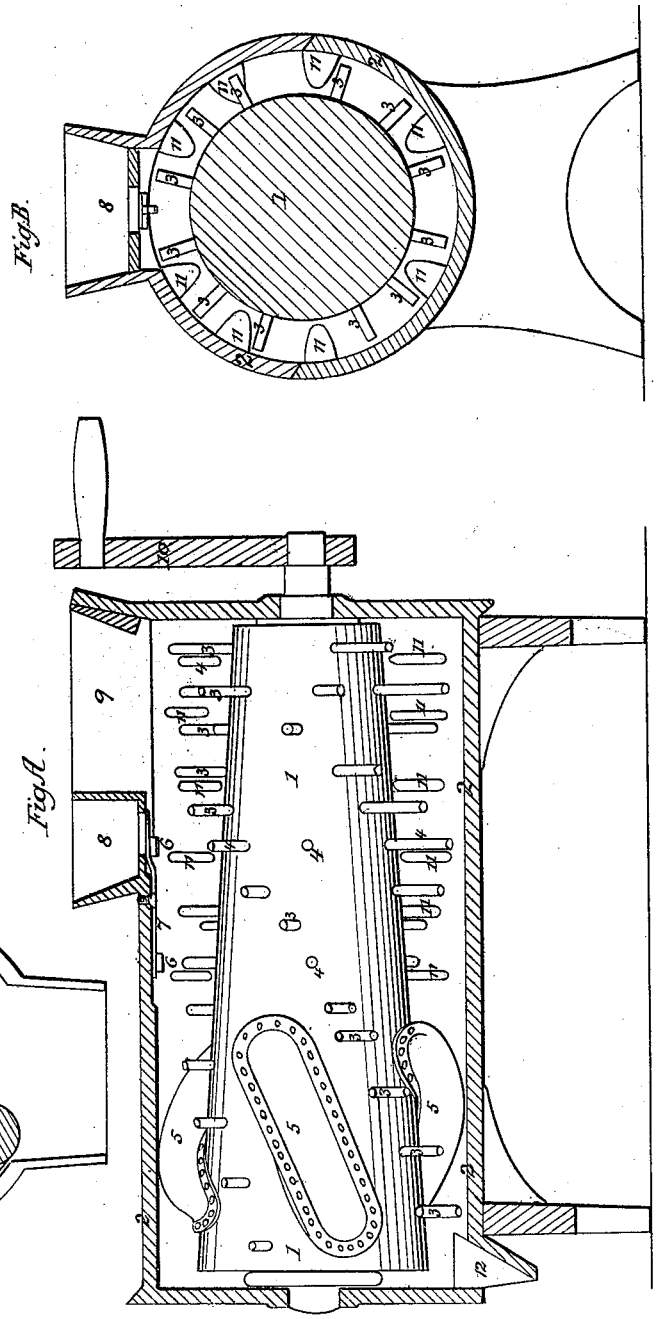

UNITED STATES PATENT OFFICE.

R. C. WRENN, OF COVINGTON, KENTUCKY.

IMPROVEMENT IN MACHINES FOR PREPARING COTTON-SEED FOR PLANTING.

Specification forming part of Letters Patent No. 13,894, dated December 4, 1855.

*To all whom it may concern:*

Be it known that I, R. C. WRENN, of Covington, in the county of Kenton and State of Kentucky, have invented a new and useful Improvement Consisting of a Machine to Prepare Cotton-Seed for Planting; and I do hereby declare that the following is a full and exact description thereof, reference being had to the accompanying drawings, forming part of this specification, and to the letters and figures of reference marked thereon.

Owing to the fibers of cotton adhering to the surface of cotton-seed they become entangled when laid together, and require picking and pulling apart when separated for planting. This process, being all done by hand in the ordinary manner, involves much labor, loss or waste of seed, and irregularity of planting.

The nature of my invention consists in providing a machine for preparing cotton-seed, in order that they may be handled and planted with less labor, and with an ordinary seed-planter, if desired.

To enable others skilled in the art to make and use my improvement, I will proceed to describe its construction and operation by referring to the accompanying drawings.

Figure A represents a longitudinal sectional elevation of the case, showing the revolving cylinder and other parts of the machine which this view is capable of showing. Fig. B is a transverse sectional view of the case through the hopper and cylinder. Fig. C is a transverse sectional view of the machine through that portion of the cylinder which is provided with pads for rolling the seed and other material into balls.

1 1 represent the cylinder, provided with bearings at each end of the case, upon which it revolves.

2 2 is the case, made to part in the middle, as shown in Fig. B, the top serving as a lid.

3 3 3 are teeth in the cylinder, and 11 11 are those placed on the inside surface of the case, bottom and top, as seen in Figs. A and B.

9 is the hopper or opening in the top of the case, through which the seed enter.

8 is a box to contain the lime or such material as may be used to form a body around the seed; and 7 is a lever screwed to the case, provided with projecting pieces 6 6. One end of the lever 7 works under an opening in the box 8, and the projections 6 6, being struck alternately by the row of teeth 4 4, jar the lime into the case.

5 5 5 are the pads for rolling the seed against the surface of the case and matting the cotton and solution around them. The pads are placed diagonally across the cylinder for the purpose of drawing the seed, when rolling, toward the opening 12 in the lower side of the case, where they are discharged.

The operation of the machine is as follows: It is set in motion by the crank 10, as seen in Fig. A, or by any other means, such as a belt and pulley. The seed are then admitted in the case through the opening 9, and are separated from each other by the teeth 3 3 3 on the surface of the cylinder, and teeth 11 11 attached to the case. They are then carried to the left end of the machine by the action of the cylinder-teeth, which run spirally, and discharged at opening 12.

I claim as my invention and desire to secure by Letters Patent—

Pads 5, in combination with cylinder 1, and the teeth 11 and 4, in combination with hopper-slide, combined and arranged substantially in the manner and for the purposes set forth.

R. C. WRENN.

Witnesses:
 MARTIN BENSON,
 L. W. SMITH.